Oct. 24, 1950 W. DZUS 2,527,408
FASTENING DEVICE
Filed May 10, 1947 2 Sheets-Sheet 1
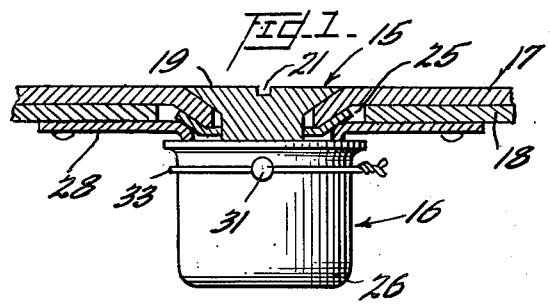
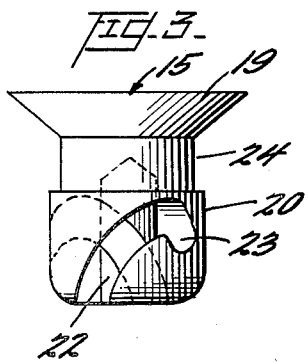
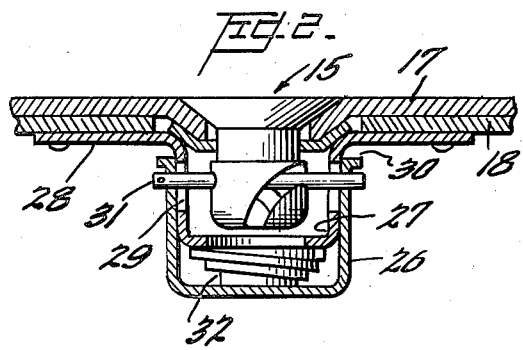
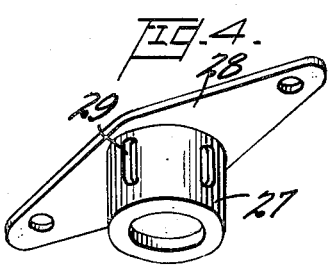
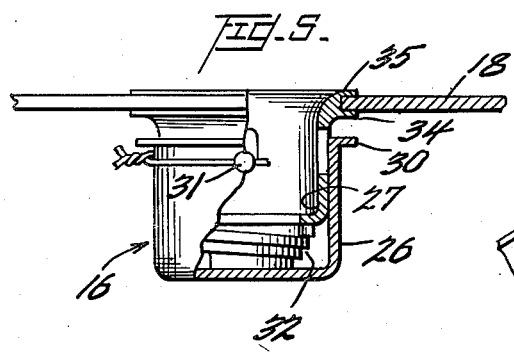
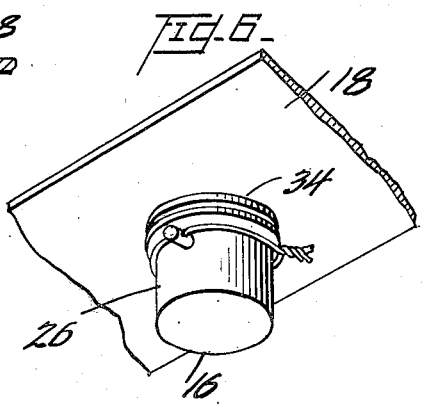
INVENTOR.
William Dzus,
BY Daniel H. Kaul
Attorney

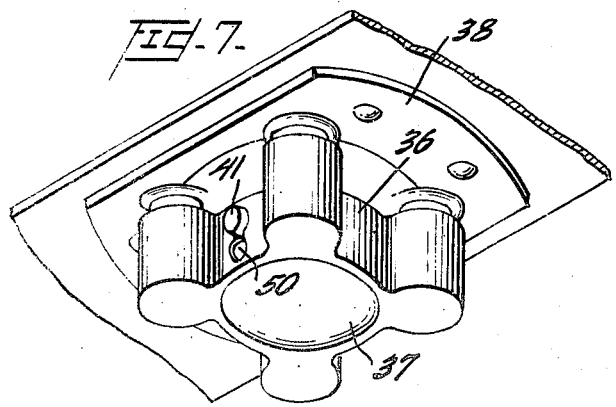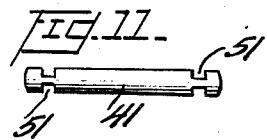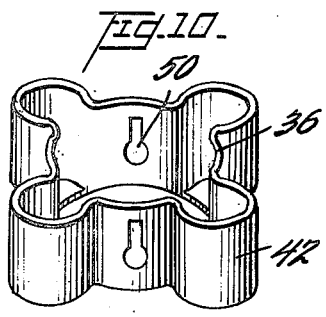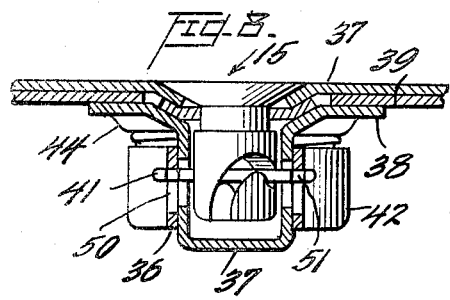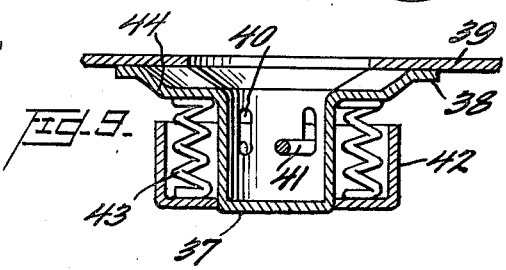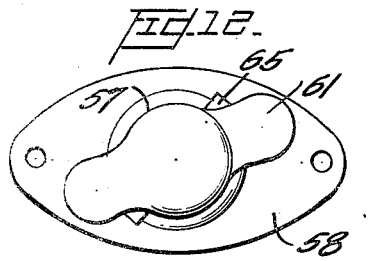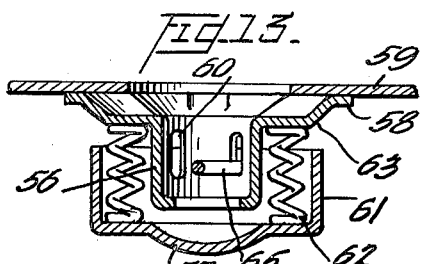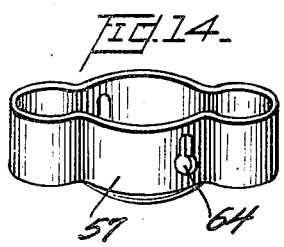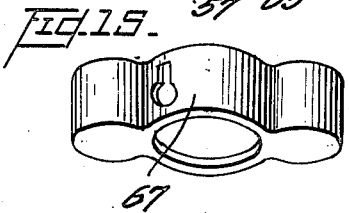

Patented Oct. 24, 1950

2,527,408

UNITED STATES PATENT OFFICE 2,527,408

FASTENING DEVICE

William Dzus, West Islip, N. Y.

Application May 10, 1947, Serial No. 747,194

7 Claims. (Cl. 24—221)

This invention relates to an improved fastening device and particularly to a fastening device of the quick-acting, self-locking type consisting of a stud member and a spring or receptacle member which are interengageable upon rotation of one member with respect to the other.

It is an object of the present invention to provide an improved spring or receptacle for fastening devices of the above character having the following advantages:

First: The receptacle is of increased strength and can withstand high loads both in shear and in tension;

Second: The receptacle is of sturdy construction, and wear and the number of wearing parts are reduced to a minimum;

Third: The device is easy to install and operate;

Fourth: The device is positive in operation, and when the fastener is locked it cannot accidently open;

Fifth: The receptacle can be readily assembled and disassembled and the individual parts replaced in case of damage or injury;

Sixth: The device is so formed that should any of the parts become broken when the fastener is locked, the broken parts will be retained in the receptacle; and Seventh: In fasteners of this type the stud head is normally provided with a screw driver slot, a wing handle, or similar device whereby the fastener is operated and the slot or wing is disposed at a pre-determined angle with respect to the receptacle when the fastener is locked. My invention has the additional advantage that the receptacle can be assembled in any one of a plurality of different manners so that the angle of the slot or wing with respect to the receptacle can be varied.

Other objects will appear from the detailed description of the drawings in which:

Fig. 1 is an elevational view of a fastener assembly embodying my invention showing the stud member, the plates or panels, the grommet and the base plate of the receptacle member in section;

Fig. 2 is a sectional view of the fastener assembly showing it in locked position;

Fig. 3 is an elevational view of the stud member;

Fig. 4 is a perspective view of the inner shell and base plate of the receptacle member;

Fig. 5 is a fragmentary elevational view of a receptacle member having a modified attaching portion showing it in unlocked position and turned 90 degrees with respect to the showing in Fig. 2;

Fig. 6 is a perspective view showing the complete receptacle member of Fig. 5;

Fig. 7 is a perspective view of a modified form of receptacle member;

Fig. 8 is a sectional view of a fastener assembly in locked position showing the modified form of receptacle;

Fig. 9 is a sectional view of the modified form of fastener receptacle showing it in normal unlocked position and turned 45 degrees with respect to the showing in Fig. 8;

Fig. 10 is a perspective view from the underside of the outer shell used in my modified form of fastener receptacle;

Fig. 11 shows the type of locking bar used in my modified form of receptacle;

Fig. 12 is a bottom plan view of a further modified type of receptacle;

Fig. 13 is a cross sectional view of the form of receptacle shown in Fig. 12;

Fig. 14 is a perspective view of the form of shell used in the modified receptacle of Figs. 12 and 13; and Fig. 15 shows a modified type of shell which may be used in place of the shell shown in Fig. 14.

Referring to the first form of my invention, the fastener consists generally of a stud member 15 and a receptacle member 16 which are interengageable upon the rotation of one with respect to the other.

The fastener may be used to secure removable parts, plates, panels, doors, cowling or the like in place. In the drawing, it is shown as applied to a pair of plates 17 and 18. The stud member 15 is associated with plate 17 which is punched and dimpled to receive the stud. The receptacle 16 is riveted to the lower plate 18, and the lower plate is provided with a somewhat larger aperture than the upper plate to accommodate the dimple and the stud when the parts are secured together.

The stud member 15 is of the spiral can type such as shown and described in my Patent No. 1,955,740. It consists of a head 19 having a depending shank 20. The head may be of any desired type, such as the flush head shown, and preferably has suitable operating means such as a screw driver slot 21. The lower portion of the shank 20 is tubular and is provided with a pair of oppositely disposed spiral cam slots 22 extending upwardly from the lower end and terminating in locking portions 23. Immediately beneath the head a groove 24 is provided whereby the stud may be held in position in the plate 17 by means of a snap ring, grommet or washer as shown at 25.

The stud heretofore described is a standard type of spiral cam fastener stud.

My invention is primarily concerned with the receptacle member 16. The receptacle member comprises a pair of generally cup-shaped shells 26 and 27, the shell 26 being slightly larger both in circumference and height than the shell 27 and having telescopic engagement therewith.

The shell 27 is formed integrally with a base plate 28 for supporting the receptacle and attaching it in position. In this connection, the base plate may be welded to the support or may be secured in position by rivets or screws passing through apertures formed therein. The outer end of the cup-like shell 27 may be closed or may be formed with a circular aperture as shown.

At its sides the shell is formed with oppositely disposed, longitudinally extended slots 29. In this connection, one pair of diametrically disposed slots is sufficient. However, I prefer to employ at least two pairs of such slots disposed at right angles to each other whereby the position of the locking member or cross-bar may be varied if desired.

The outer shell 26 has a sliding fit with the inner shell and is closed at its outer end and formed with a reinforcing flange 30 at its inner end. Adjacent its flanged end, the outer shell 26 is formed with a pair of diametrically opposite apertures which accommodate the locking member or cross-bar 31. Between the outer ends of the two shells is disposed the helical spring 32.

In assembling the receptacle member, the spring is inserted between the two shells and the two shells are placed in telescopic relationship. The shells are telescoped sufficiently and the springs are compressed so that the locking bar 31 can be inserted thru the apertures in the outer shell and thru one pair of slots in the inner shell. For this purpose either pair of slots may be selected depending upon the desired position of kerf 21 when in locked position.

If desired, the parts may be so proportioned that spring 32 is pre-loaded. In other words, when the receptacle is in unlocked position, the cross-bar 31 is positioned in the outer end of slots 29 and helical spring 32 is partially compressed.

The cross-bar 31 is suitably retained in position in the receptacle so that it will not become accidently displaced. Any suitable retaining means may be employed such as, for instance, a retaining wire 33 extending around the outer shell 26 thru apertures formed in the ends of the crossbar. The ends of the wire may be twisted together as shown.

In using the fastening device, the stud is applied to one part and the receptacle to the other part as shown. To secure the parts together, they are assembled in superimposed relationship and the end of the stud is projected into the receptacle. The cross-bar 31 will then rest in the entrance branches of slots 22 of the stud. Upon rotation of the stud in a clockwise direction, the cross-bar 31 is drawn upwardly by the spiral cam slots until it is locked in position behind the locking shoulders. As the cross-bar is drawn upwardly it will be appreciated that it causes shell 26 to slide telescopically on shell 27 further compressing the spring 32. The force exerted by the spring serves to retain the parts in locked position and enables the fastener to withstand considerable shocks and vibration without accidently opening.

When the parts are in normal locked position as shown in Fig. 2, the cross-bar 31 is positioned a short distance from the inner end of slots 29. During normal usage, the force of spring 32 is sufficient to withstand any load which may be applied to the parts in tension to pull them apart. Should an extraordinary load be applied greater than the force exerted by the spring, cross-bar 31 will be shifted to the inner ends of slots 29 and will rest against the base of the slots. This provides a rigid support preventing further separation of the parts and serving to firmly hold the parts in assembled relationship.

Referring now to the modified form of receptacles shown in Figs. 5 and 6, the general assembly and relationship of the parts is the same. However, the inner shell 27 is not provided with a base plate 28. Instead, it is provided with an external shoulder 34 a short distance from the upper end thereof. The shoulder is adapted to rest against the under surface of plate 18. The portion of the cup above the shoulder is projected thru the aperture in plate 18 and is flared outwardly on the upper surface of the plate as shown at 35 in Fig. 5. This arrangement provides a single hole mounting for the receptacle and is particularly suitable for certain types of installation.

Referring now to the form of my invention shown in Figs. 7 to 11, I have shown a modified type of receptacle consisting of a pair of shell members 36 and 37 arranged in telescopic relationship. The inner shell member 37 is of generally cup shape and is provided with an integral base plate 38 for attaching the receptacle to the support 39. The shell member 37 is provided with oppositely disposed longitudinally extended slots 40 corresponding to the slots 29 in the first form of my invention. The outer end of shell member 37 is preferably closed in this form of my invention.

Shell member 36 has sliding engagement with shell member 37 and is formed with oppositely disposed apertures 50 to accommodate the locking bar 41.

The apertures 50 are of generally inverted keyhole shape having a circular portion large enough to accommodate the main body of locking bar 41 and a narrower slotted portion which will not accommodate the main body of the locking bar but will accommodate the reduced portions 51 formed adjacent the two ends of the locking bar.

The locking bar is assembled with the shell at 36 by being inserted thru the circular portions of aperture 50 until the reduced shanks 51 are in engagement therewith. The locking bar is then shifted at right angles to its longitudinal axis so that the reduced shank portions 51 are in engagement with the slotted portions of the apertures 50. When assembled in this fashion, it will be appreciated that the locking bar cannot be withdrawn longitudinally from engagement with the apertures.

To remove the locking bar it must first be shifted to the circular portions of the apertures and then withdrawn longitudinally.

The outer shell member is also formed with a plurality of spring receiving chambers 42 arranged around the periphery thereof and adapted to accommodate the helical springs 43. These chambers are closed at their outer ends and open at their inner ends, and the springs 43 extend between the closed outer ends of the chamber and the elevated spring abutment portions 44 formed on the base plate 38.

The number of spring chambers and springs employed may be varied with the locking tension desired to be obtained. In the illustrated embodiment, I have shown four spring chambers and springs disposed at approximately 90 degree intervals around the periphery of shell 76.

In assembling the receptacle, the springs are placed in the spring chambers, and shell 36 is placed in telescopic relationship with shell 37 with the ends of the springs resting against the spring abutments 44. The shells are telescoped sufficiently and the springs are compressed so that cross-bar 41 can be inserted through the circular portions of apertures 50 in shell 36 and thru one pair of slots in shell 37. The parts are so proportioned that when they are assembled the springs cause shell 36 to be shifted outwardly to its extreme limit of movement as shown in Fig. 9 with the locking bar 41 in engagement with the lower ends of slots 40 and with the shanks of the locking bars disposed in the reduced slotted portions of apertures 50 and in engagement with the upper end thereof. This arrangement serves to retain the locking bar 41 against accidental displacement and to hold the receptacle in assembled relationship.

If desired, the springs 43 may also be preloaded or pre-compressed when in their normal unlocked position as in the first form of the invention.

The receptacle may be applied to the part 39 by spot welding or by rivets extending thru the apertures in the base plate. Stud 15 is applied to part 17 in the manner previously described, and the stud interengages with the receptacle in the same manner as in the first form of my invention.

Due to the fact that a plurality of springs may be employed, the receptacle shown in Figs. 7 to 11 may be made so as to have considerably higher initial locking tension than in the receptacle shown in the first form of my invention. As will appear from Fig. 8, when the device is in locked position, the cross-bar 41 is spaced a short distance from the inner ends of slots 40. The inner ends of the slots 40 serve in the same manner as the ends of slots 29, as auxiliary supports for the cross-bar 41, when an extraordinary load in tension is applied to the parts. They also serve to limit the separation between the parts.

Cross-bar 41 is retained in position by the arrangement previously described, i. e., the reduced shank portions are in engagement with the slotted portions of apertures 50. The action of springs 43 serves to normally maintain this relationship when the receptacle is unlocked. When the receptacle is locked, the action of the stud pulling upon the cross-bar serves further to maintain this relationship.

In Figs. 12, 13 and 14 I have shown a further modified form of receptacle somewhat similar to that shown in Figs. 7 to 11 but employing two springs. In this form of receptacle I have shown an inner shell 56 and an outer shell 57. The inner shell is formed integrally with a base plate 58 which may be riveted or otherwise secured to a support as shown at 59 in Fig. 13. Oppositely disposed slots 60 are provided in the inner shell and are arranged in pairs similar to the slots 29.

The outer shell 57 has sliding engagement with the inner shell and is closed with a dome-like structure as shown. A pair of spring chambers 61 are provided in the outer shell and they accommodate the springs 62 which extend between the closed top of the outer shell and the raised abutment portions. The outer shell is provided with inverted keyhole type of slots 64 similar to the slots 50 which accommodate the locking bar 65 which in turn is similar in construction to the locking bar 41.

The form of receptacle shown in Figs. 12 to 14 is assembled in the same manner as the receptacle shown in Figs. 7 to 11 and the parts are similarly proportioned to retain the receptacle in assembled relationship.

In Fig. 15 I have shown a modified form of outer shell 67 which may be used in place of the shell 57 in the last form of receptacle. In shell 67 the closed dome is eliminated and an aperture is provided in its place. This form of shell is particularly desirable where humidity or dampness is encountered and drainage of condensate is required.

The shell 67 is assembled with the receptacle shown in Figs. 12 and 13 in the same manner as shell 57.

It will be appreciated that in each of the illustrated form of my device the receptacle is so designed and made as to be able to withstand both high loads in shear and in tension. It will also be seen that they are of sturdy construction and that wear and the number of wearing parts are reduced to a minimum. The receptacle can also be readily assembled in the manner previously described and can also be readily disassembled by removing the cross-bar so as to permit the replacement of parts. All forms of the receptacle are easy to install and operate, are positive in operation and when locked will not accidently open.

By changing the location of cross-bar 41 with respect to the slots in the inner shell, the relative position of the screw driver kerf in the stud member when in locked position can be varied.

The helical type springs employed in my device are long wearing and serve to prolong the life and endurance of the receptacle. This is important where the fastener is subjected to repeated operation or to extraordinary loads and stresses which cause "panting" or "breathing" of the parts. The endurance of the springs can be further enhanced by making them of hard, drawn steel wire such as music wire.

My device also has the advantage that if any of the parts should break when it is in locked position, the loose or broken parts will be retained inside of the receptacle and will not fall out and jam or damage the controls, engines, motors or other moving parts located near the fastening device.

Modifications may be made in the illustrated and described embodiments of my invention without departing from the invention as set forth in the accompanying claims.

I claim:

1. For use in a fastening device having a stud member and a receptacle member which are interengageable upon the rotation of one with respect to the other, an improved receptacle member comprising a first inner tubular shell portion formed with a pair of elongated slots in opposite sides thereof, a second outer tubular shell portion in telescopic relationship with the first shell portion and shiftable with respect thereto, a locking bar for interlocking engagement with a stud member carried by the second shell portion and extending across both shell portions and through the elongated slots in the first shell portion whereby the shifting of the locking bar and the second shell portion with respect to the first shell portion is confined within predetermined limits and resilient means interposed between the two shell portions and exteriorly of the first tubular shell portion for normally shifting the second shell portion and locking bar to one predetermined position, said first tubular shell portion having an opening at one end and being free from obstructions so as to accommodate the stud member and afford access to the locking bar.

2. An improved receptacle member as set forth in claim 1 in which the resilient means comprises a plurality of helical springs disposed around the first shell portion.

3. A receptacle member as set forth in claim 1 in which the resilient means comprises a plurality of springs disposed around the first shell portion and arranged in substantially equally spaced relationship.

4. A receptacle member as set forth in claim 1 in which the resilient means comprises a pair of helical springs arranged on diametrically opposite sides of the first shell portion and are substantially encased by the second shell portion.

5. An improved receptacle member as set forth in claim 1 in which the resilient means comprises a spring extending between the upper portions of the two shells.

6. For use in a fastening device having a stud member and a receptacle member which are interengageable upon the rotation of one with respect to the other, an improved receptacle member comprising a pair of shell portions shiftable telescopically with respect to each other, resilient means for normally urging the shell portions to one pre-determined position and a releasable locking bar carried by one of the shell members and engageable with the other shell member to confine the movement of the shell members within pre-determined limits, one of the shell members having a keyhole type of opening with an enlarged portion and a reduced slotted portion and the locking bar having a portion of reduced width disposed in the slotted portion of the opening and another portion of greater width than the reduced portion of the opening to prevent accidental release of the locking bar from said shell member.

7. For use in a fastening device having a stud member and a receptacle member which are interengageable upon the rotation of one with respect to the other, an improved receptacle member comprising a pair of shell portions shiftable telescopically with respect to each other, resilient means for normally urging the shell portions apart and a releasable locking bar for interlocking engagement with a stud member extending across the shell members and maintaining them in assembled relationship, one of the shell members having a keyhole type of opening with an enlarged portion and a reduced slotted portion and the locking bar having a reduced shank portion disposed in the slotted portion of the opening and also having a portion of greater diameter than the slot to prevent accidental withdrawal of the locking bar.

WILLIAM DZUS.

REFERENCES CITED

The following references are of record in the file of this patent:

UNITED STATES PATENTS

| Number | Name | Date |
|---|---|---|
| 2,197,783 | Barrows | Apr. 23, 1940 |